United States Patent
Shanmuganathan (10) Patent No.: US 11,681,660 B2
(45) Date of Patent: *Jun. 20, 2023

(54) GLOBAL DEDUPLICATION

(71) Applicant: Cohesity, Inc., San Jose, CA (US)

(72) Inventor: Ganesha Shanmuganathan, San Jose, CA (US)

(73) Assignee: Cohesity, Inc., San Jose, CA (US)

(*) Notice: Subject to any disclaimer, the term of this patent is extended or adjusted under 35 U.S.C. 154(b) by 34 days.

This patent is subject to a terminal disclaimer.

(21) Appl. No.: 17/156,091

(22) Filed: Jan. 22, 2021

(65) Prior Publication Data

US 2021/0141768 A1  May 13, 2021

Related U.S. Application Data

(63) Continuation of application No. 16/021,460, filed on Jun. 28, 2018, now Pat. No. 10,936,546, which is a continuation of application No. 14/852,820, filed on Sep. 14, 2015, now Pat. No. 10,037,337.

(51) Int. Cl.
*G06F 16/00* (2019.01)
*G06F 16/174* (2019.01)
*G06F 16/182* (2019.01)
*G06F 3/06* (2006.01)

(52) U.S. Cl.
CPC ......... *G06F 16/1752* (2019.01); *G06F 3/067* (2013.01); *G06F 3/0608* (2013.01); *G06F 3/0641* (2013.01); *G06F 16/183* (2019.01)

(58) Field of Classification Search
CPC .. G06F 16/1752; G06F 16/183; G06F 3/0608; G06F 3/0641; G06F 3/067
See application file for complete search history.

(56) References Cited

U.S. PATENT DOCUMENTS

| | | | |
|---|---|---|---|
| 2011/0167221 A1 | 7/2011 | Pangal | |
| 2015/0213049 A1* | 7/2015 | Kleiman | G06F 16/1752 707/692 |
| 2016/0044100 A1 | 2/2016 | Tripathy | |

OTHER PUBLICATIONS

Wikipedia-Metropolitan area network, <https://en.wikipedia.org/wiki/Metropolitan_area_network> (Year: 2022).*

* cited by examiner

*Primary Examiner* — Hung Q Pham
(74) *Attorney, Agent, or Firm* — Van Pelt, Yi & James LLP (57) ABSTRACT

Embodiments presented herein describe techniques for deduplicating chunks of data across multiple clusters. A process executing in a storage system identifies one or more chunks in an incoming stream of data. For each chunk, a first fingerprint corresponding to the chunk is generated. The process determines whether the first fingerprint matches a second fingerprint listed in a corresponding entry in a deduplication map. Each entry of the deduplication map corresponds to a chunk stored in a location in one of the storage clusters. Upon determining that the first fingerprint matches the second fingerprint, the process writes, to a local persistent storage, a pointer referencing the location in that storage cluster.

14 Claims, 8 Drawing Sheets

GLOBAL DEDUPLICATION

CROSS REFERENCE TO OTHER APPLICATIONS

This application is a continuation of U.S. patent application Ser. No. 16/021,460, entitled GLOBAL DEDUPLICATION filed Jun. 28, 2018, which is incorporated herein by reference for all purposes, which is a continuation of U.S. patent application Ser. No. 14/852,820 entitled GLOBAL DEDUPLICATION filed Sep. 14, 2015, now U.S. Pat. No. 10,037,337 which is incorporated herein by reference for all purposes.

BACKGROUND

Field

Embodiments presented herein generally relate to data deduplication, and more specifically, to deduplicating chunks of data across multiple clusters.

Description of the Related Art

Data deduplication is a compression technique for eliminating duplicates of repeating data stored or being transferred over a network. A deduplication process identifies distinct chunks of data and generates a hash fingerprint of each chunk. The process then identifies matching fingerprints that indicate, with relatively high probability, that the underlying chunks are identical. Further, the deduplication process replaces one of the chunks associated with a matching fingerprint with a pointer that references the chunk of the other fingerprint. Identical chunks can recur numerous times in stored blocks or incoming streams of data, and thus, the deduplication process reduces the amount of the data. As a result, deduplication can improve storage utilization and network data transfer.

Currently, many distributed storage systems implement some form of data deduplication. For example, a distributed secondary storage system may apply in-line data deduplication, where a deduplication process identifies identical chunks of data as data is being written to storage. The secondary storage system may also apply post-process deduplication, where the deduplication process analyzes stored data to identify identical chunks. In any case, deduplicated chunks may be distributed across nodes in a cluster representing the distributed secondary storage system. That is, as a node analyzes chunk fingerprints for matches, the node can scan fingerprints of chunks stored in other cluster nodes. In addition, the node may also write pointers referencing chunks stored in other cluster nodes.

SUMMARY

One embodiment presented herein describes a method for deduplicating a chunk of data across a plurality of storage clusters. The method generally includes identifying, via a storage system, one or more chunks in an incoming stream of data. The method also generally includes the following steps for each chunk. A first fingerprint corresponding to the chunk is generated. Whether the first fingerprint matches a second fingerprint of a plurality of fingerprints is listed in a corresponding entry in a deduplication map is determined. Each entry in the deduplication map corresponds to a chunk stored in a location in one of the plurality of storage clusters. Upon determining that the first fingerprint matches the second fingerprint, a pointer referencing the location in one of the plurality of storage clusters is written to a persistent storage local to the storage system.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe techniques for deduplicating data across clusters of a distributed storage system, as well as to a cloud provider network.

For example, embodiments may be adapted to a distributed secondary storage system. The distributed secondary storage system may be organized in a cluster of computing nodes. In one embodiment, each cluster node maintains a deduplication map that tracks deduplicated chunks stored by each cluster node. For instance, the deduplication map may specify a given fingerprint of a deduplicated chunk and also specify a location in the cluster where the chunk is stored, i.e., a node and block address storing the chunk. Further, the deduplication map is global to the cluster, i.e., updates to the deduplication map by a given node are propagated to other nodes in the cluster. The deduplication map allows a node to identify whether a deduplicated chunk exists in the cluster for a chunk of data currently being analyzed for deduplication.

Further, the distributed secondary storage system may be composed of multiple clusters. For example, assume that the distributed storage system belongs to an enterprise consisting of multiple branches and departments across the country. One cluster may correspond to an enterprise branch in a given geographic location, and another cluster may correspond to a different enterprise branch in another geographic location.

In one embodiment, the deduplication map supports deduplicating chunks across multiple clusters. To provide such support, the deduplication map includes a field for map entries that indicates in which cluster a deduplicated chunk is stored. Thus, when a node analyzes chunks of data on disk for deduplication, the node can evaluate a cluster location field in the deduplication map to identify matching chunk fingerprints over the multiple clusters of the distributed secondary storage system. Further, when a given cluster node writes a chunk to storage, the node may update the deduplication map to indicate that the chunk is stored within the node's cluster.

Further still, in one embodiment, this approach also allows the deduplication map to support deduplicating chunks to a cloud provider network. A cloud provider may host a virtual cluster of nodes of the distributed secondary storage system, where the nodes are virtual machine instances that are configured to perform the same tasks as physical servers in the distributed secondary storage system. When a node hosted in the cloud writes a chunk to virtual storage, the node updates the deduplication map to indicate the cluster location and a logical block address in the cloud where the chunk is stored. Thereafter, a node from another cluster (e.g., a physical cluster) may reference that chunk via the deduplication map.

In one embodiment, the deduplication map may be expanded to reference chunks of data maintained in cloud storage not directly associated with the distributed secondary storage system. That is, storage clusters (e.g., maintained or shared by third-party enterprises) hosted in the cloud can maintain a deduplication map that is shared with the distributed storage system. As a result, an amount of deduplicated chunks available for reference greatly increases.

To address issues of latency and fault tolerance, cluster nodes may include logic for determining whether to reference a deduplicated chunk stored in a remote cluster or to maintain a local copy of the chunk. The logic may be based on distance, availability, and bandwidth of the remote cluster storing the deduplicated chunk. For instance, the logic may determine to maintain a chunk locally to satisfy replication objectives specified in a configuration of the distributed secondary storage system (e.g., to ensure that a chunk of data is available in more than one storage location).

Figure 1:
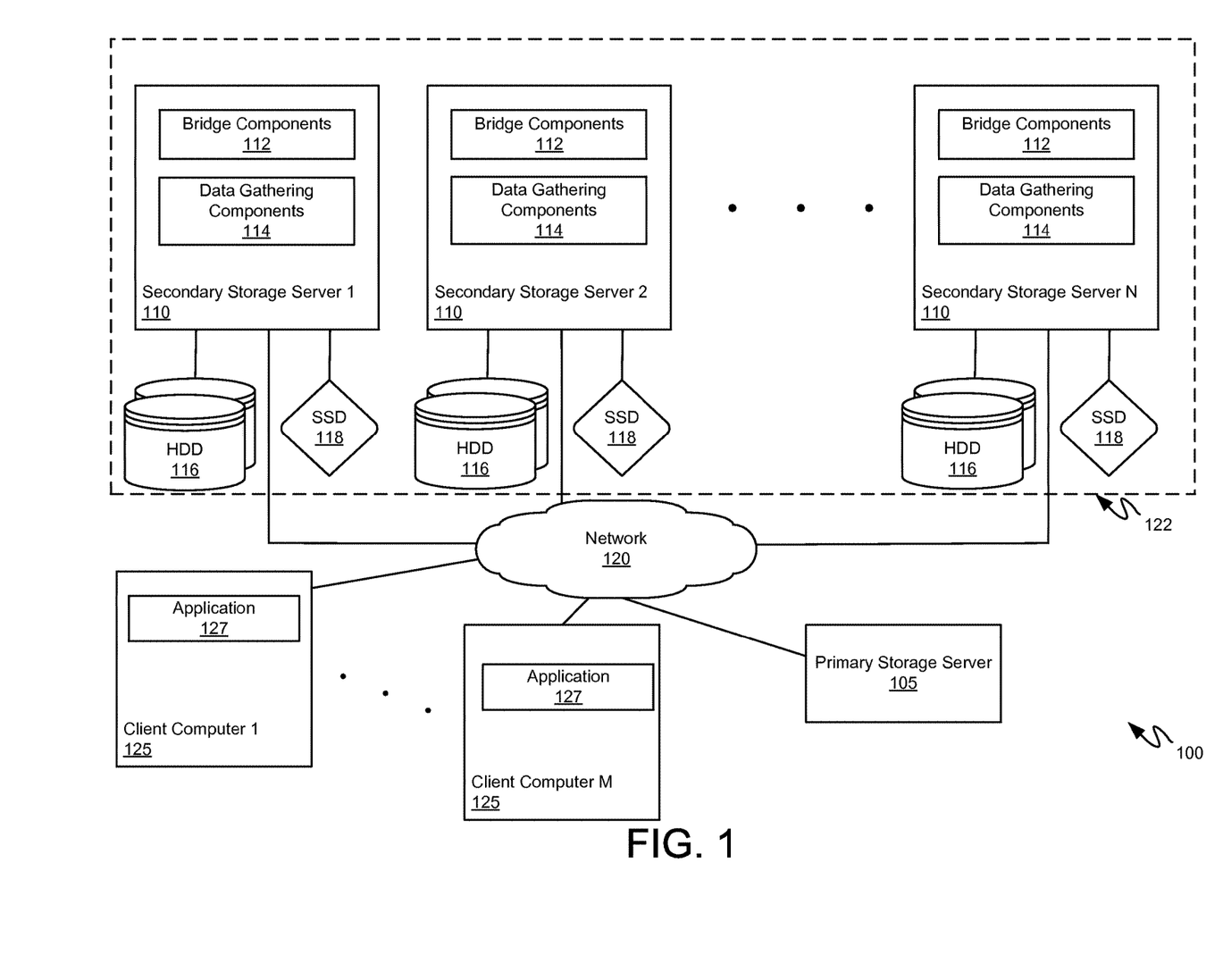
FIG. 1 illustrates an example computing environment, according to one embodiment.

FIG. 1 illustrates an example computing environment 100, according to one embodiment. As shown, the computing environment includes a primary storage server 105 and a cluster 122. As shown, the cluster 122 includes multiple secondary storage servers 110 (labeled secondary storage servers 1-N 110) that host and manage a distributed service (e.g., secondary storage services). The primary storage server 105 and secondary storage servers 110 are each connected via a network 120. The primary storage server 105 and secondary storage servers 110 may provide storage for a data center.

In particular, the cluster 122 of secondary storage servers 110 form a distributed file system which provides backup storage and services to the primary storage server 105. Illustratively, each secondary storage server 110 (or "node") of the distributed file system includes bridge components 112 and data gathering components 114. The bridge components 112 may provide software applications that allow external clients to access each node. The data gathering components 114 are generally configured to retrieve data from primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as serial-write transactions. In one embodiment, the distributed file system is the SnapFS® developed by Cohesity, Inc.

In one embodiment, distributed cluster 122 may expose backup data to applications 127 on client computers 125 (as client computers 1-M 125). For example, assume the distributed cluster 122 provides a backup of a file system on the primary storage server 105. In such a case, the cluster 122 could create a snapshot of a file system on the primary storage server 105 every few minutes. Further, the cluster 122 could expose a clone of one of the snapshots to applications 127. For example, the cluster 122 could export a clone as an NFS mount point (or SMB, CIFS, etc.), allowing the client computers 125 to mount the snapshot over a directory in the local file system of the client computer 125. In such a case, the bridge components 112 may respond to requests from client computers 125 to perform NFS operations (or operations for SMB, CIFS, etc.) on the mounted directory (e.g., lookup, create, read, write, rename, remove, etc.).

Figure 2:
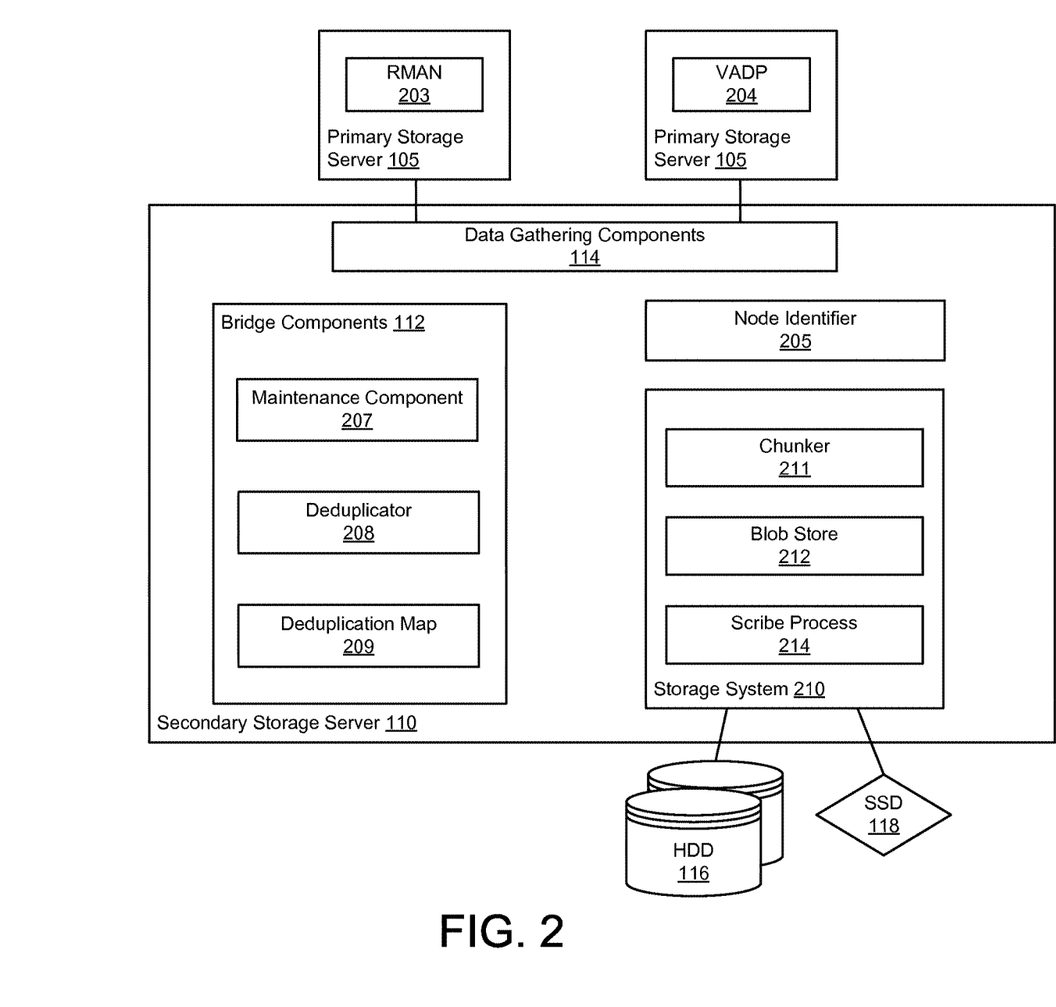
FIG. 2 illustrates an example of one of the secondary storage servers described relative to FIG. 1, according to one embodiment.

FIG. 2 further illustrates an example of one of the secondary storage servers 110, according to one embodiment. As shown, the secondary storage server 110 includes bridge components 112, data gathering components 114, a node identifier 205, and a storage system 210. The node identifier 205 is a distinct value that may be based on the MAC address of the secondary storage server 110. The bridge component 112 further includes a maintenance component 207, a deduplicator 208, and a deduplication map 209.

As stated, the data gathering components 114 communicate with primary storage servers in the computing environment 100. Illustratively, the data gathering components 114 may retrieve data from primary storage servers 201 and 202, where each primary storage server 201 and 202 execute backup protocols such as recovery manager (RMAN) 206 and vStorage APIs for Data Protection (VADP) 207.

The secondary storage server includes a storage system 210. The storage system 210 itself includes a chunker 211, a blob store 212, and a scribe process 214. The storage system 210, in conjunction with the storage systems of other secondary storage servers in the cluster, forms a distributed system used to store backup data from the primary storage services. Further, the secondary storage server 110 may create each backup with its own format according to a backup object. For example, assume the bridge components 112 receive a virtual machine disk (VMDK) from the data gathering components 114. In such a case, backup processes executing in the bridge components 112 write the VMDK to disk storage. In one embodiment, the chunker 211 is a process that receives data (e.g., in-line data or post-process data) and identifies chunks in the data.

In addition, file system metadata is stored in SSD 118. However, as a VMDK file can be quite large (e.g., terabytes), bridge components 112 may store the VMDK file as set of smaller blobs (binary large object) files managed by a blob manager, each having a set of chunks (e.g., approximately 8 KB each). Backup data below a given size threshold (e.g., files less than 256K bytes) could be stored in the SSD 118 directly along with the file system metadata. Each blob is encoded according to a backup format of the secondary storage system.

Data in the secondary storage server 110 may be stored in distributed B+ trees or blob structures. In one embodiment, data smaller than 256 KB resides in distributed B+ trees, and data larger than 256 KB is stored in blob structures. The secondary storage server 200 may maintain a blob store 214 that contains the blob structures. Each blob may be divided into regions of a particular size, such as 1 MB. These regions, or "bricks," may further contain chunks of data that reference logical files in the SSD 118 and the HDDs 116.

In one embodiment, the scribe process 214 also maintains information about the chunks of data in the blob store 212 in key-value stores (e.g., tree structures). One example key-value store may map blob structures to brick sections. Another store may map bricks to chunks. Yet another store may map chunks to logical files storage drives of the secondary storage server 110.

In one embodiment, the deduplicator 208 is a process of the bridge components 112 that generates a fingerprint for each chunk. To do so, the deduplicator 208 may perform a fingerprinting algorithm, such as a Rabin algorithm. Of course, other types of fingerprinting algorithms may be suitable. The deduplicator 208 evaluates a given fingerprint to determine whether a match exists with a previously identified fingerprint in the distributed storage system. If so, then the deduplicator 208 may write a pointer to the deduplicated chunk associated with the previously identified fingerprint. Doing so allows the secondary storage server 111 to perform write operations to disk storage relatively quickly. In one embodiment, to evaluate a fingerprint for matches, the deduplicator may reference the deduplication map 209. The deduplication map 209 lists entries of fingerprints maintained in the distributed secondary storage system.

Figure 3:
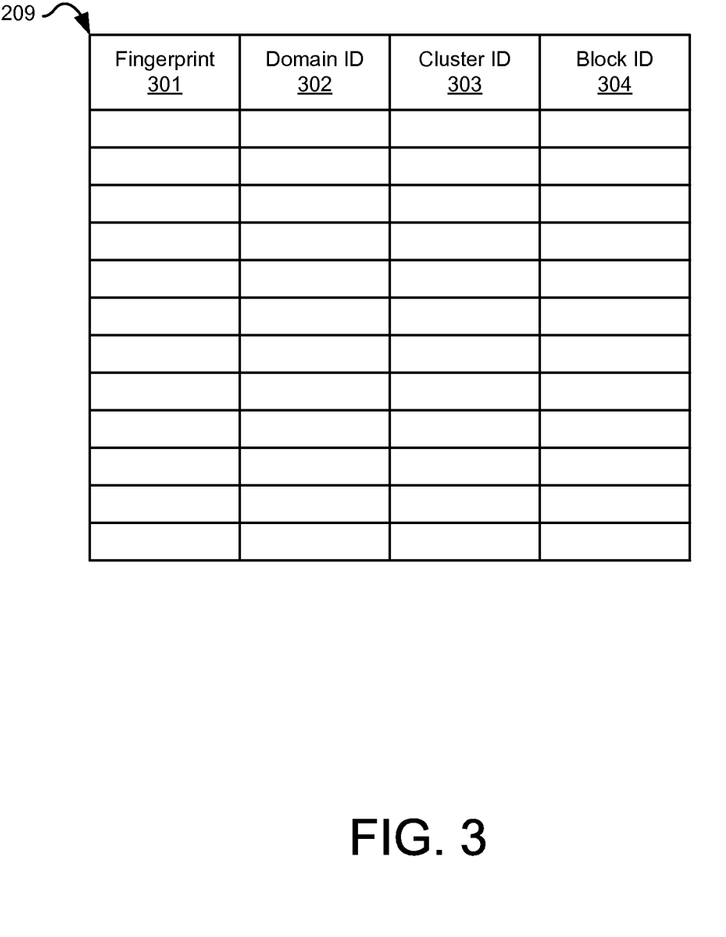
FIG. 3 illustrates an example deduplication map, according to one embodiment.

FIG. 3 illustrates an example of the deduplication map 209, according to one embodiment. Illustratively, the deduplication map 209 may include multiple entries, each entry having a field for a fingerprint 301, a domain ID 302, a cluster ID 303, and a block ID 304.

In one embodiment, the fingerprint 301 specifies a hash corresponding to a given chunk fingerprint. The domain ID 302 is a flag indicates whether the entry is of a cluster that shares deduplicated chunks with other clusters. For example, if a domain ID 302 is set to a given value, such as 0, that value may indicate that global sharing is enabled for that cluster. The cluster may make its deduplicated chunks available to nodes in remote clusters for reference. If the domain ID 302 is set to another given value, such as 1, the value may indicate that global sharing is disabled for that cluster. In this case, a cluster (indicated by the cluster ID 303) will only locally reduplicate chunks, as opposed to providing deduplicated chunks for reference. Further, the domain ID 302 can be set to a specified value such that clusters having that domain ID 302 share deduplicated chunks with one another (and only to clusters sharing that domain ID 302).

The block ID 304 indicates a location within the specified cluster (as indicated by the cluster ID 303) of where a given deduplicated chunk is stored. The block ID 304 may reference the node and the disk sector in which the chunk corresponding to the fingerprint 301 is stored.

Figure 4:
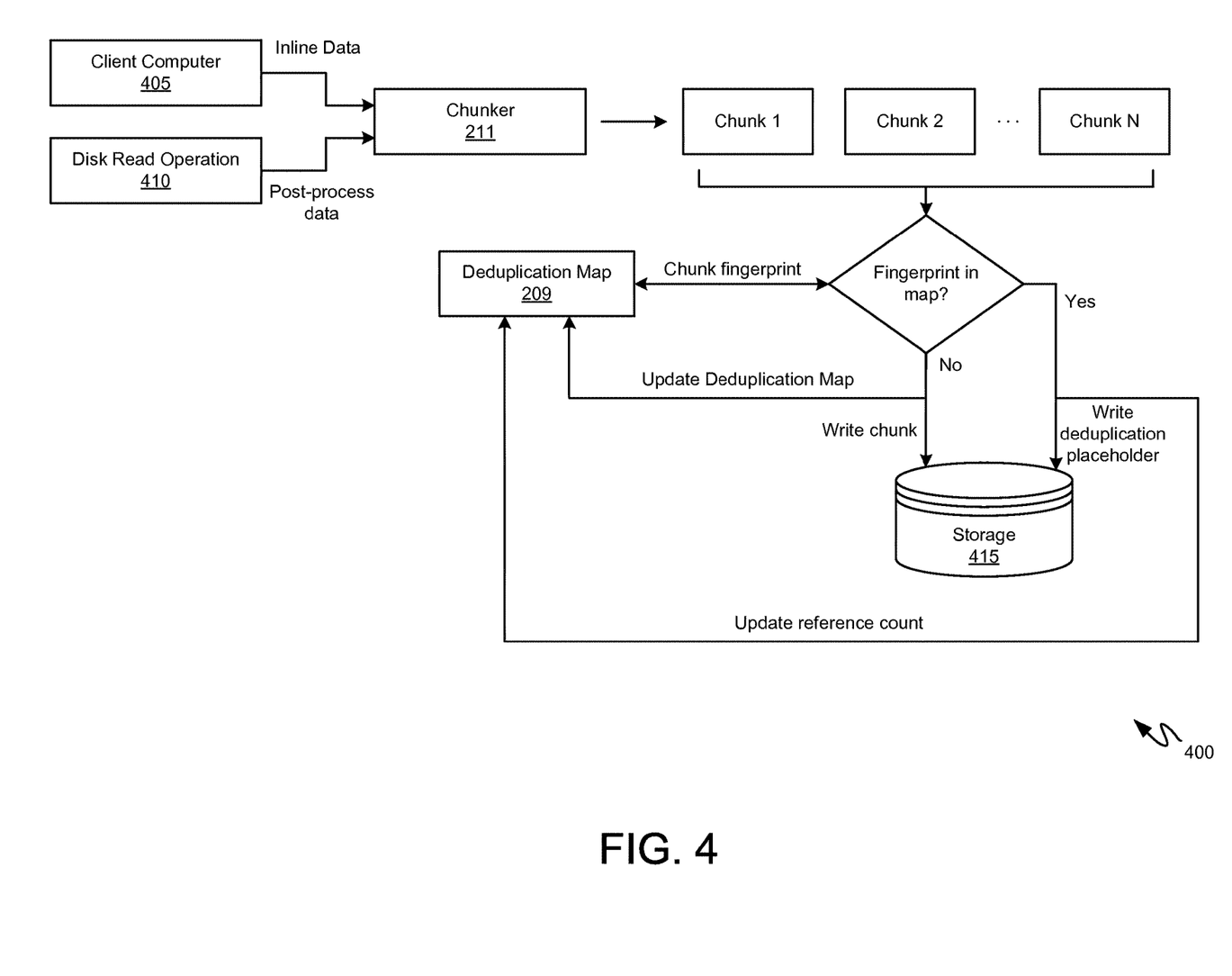
FIG. 4 illustrates an example flow of performing cluster-based deduplication in distributed storage system, according to one embodiment.

FIG. 4 illustrates an example flow 400 of performing cluster-based deduplication in distributed storage system, according to one embodiment. Illustratively, the chunker 211 receives data from a given source. For example, the data may correspond to a stream of incoming data originating from a client computer 405. As another example, the data may correspond to previously stored data obtained by performing a disk read operation 410 on one of the storage disks (e.g., the HDD 116 or the SSD 118).

As shown, the chunker 211 identifies and separate the data into a number of chunks, depicted in FIG. 4 as Chunk 1 to Chunk N. For each chunk, the deduplicator 208 generates a hash fingerprint and evaluates the fingerprint against the deduplication map 209. The deduplicator 208 does so to determine whether a previously identified fingerprint exists in the distributed secondary storage system. If so, then the deduplicator 208 writes a pointer to the corresponding deduplicated chunk into storage 415 and updates a reference counter. If not, then the deduplicated 208 writes the chunk to the storage 415 and updates the deduplication map to indicate the location of the newly written deduplicated chunk. Doing so allows the chunk to be subsequently referenced.

Figure 5:
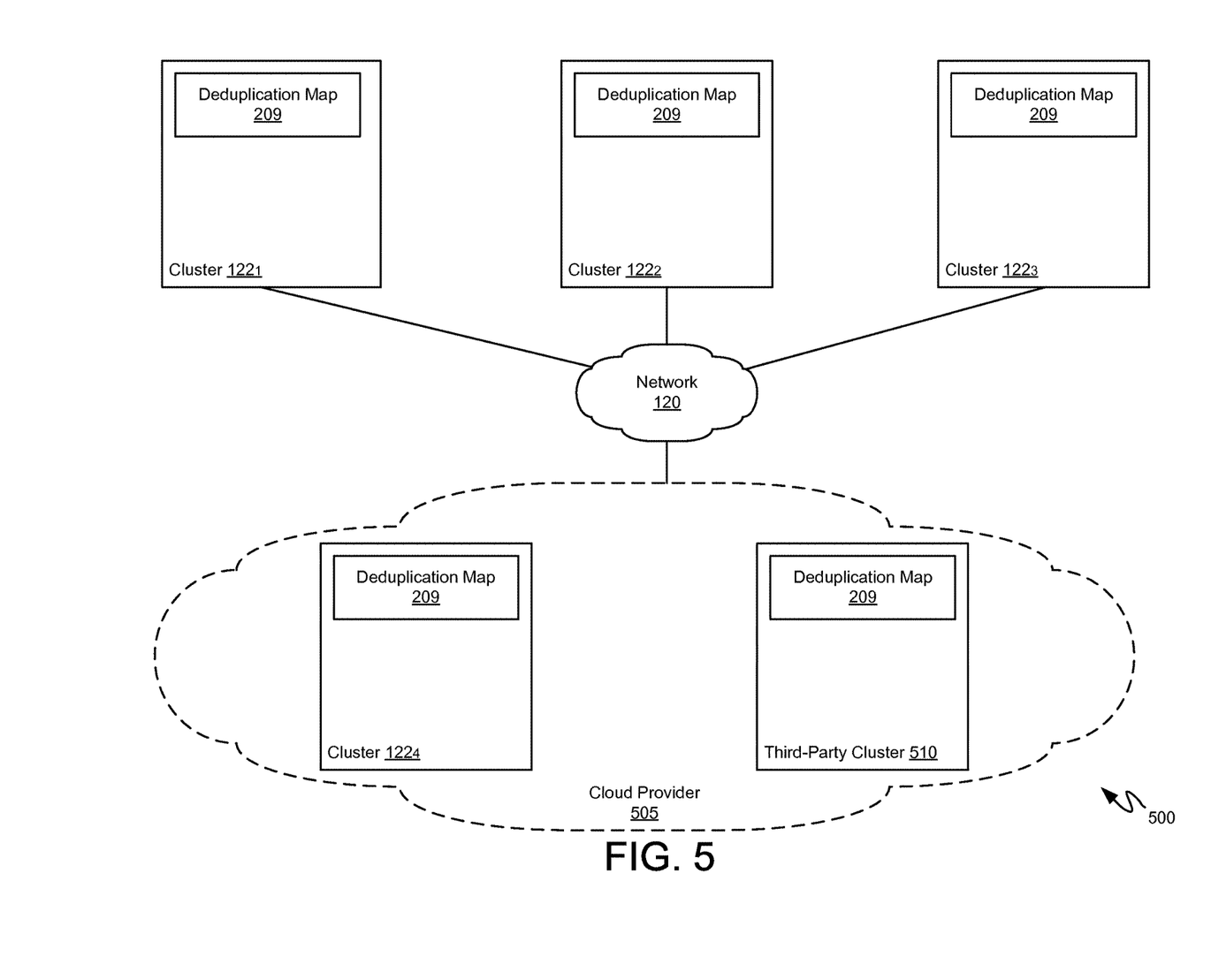
FIG. 5 illustrates a diagram of clusters configured to support global deduplication, according to one embodiment.

FIG. 5 illustrates a diagram 500 of clusters configured to support global deduplication, according to one embodiment. As noted, the deduplication map 209 indicates multiple clusters where deduplicated chunks may be stored and shared to other clusters of the distributed secondary storage system.

As shown, the diagram 500 depicts three clusters $122_{1-3}$ interconnected via the network 120. The deduplication map 209 may be distributed among each of the clusters $122_{1-3}$. By sharing the deduplication map 209, each cluster 122 may reference deduplicated chunks in any of the other clusters (if the other clusters allow). This approach increases the availability of deduplicated chunks in the distributed secondary storage system.

To further increase availability, the deduplication map 209 can further be extended to a cloud provider 505. For example, the distributed secondary storage system may manage a cluster 1224 within the cloud provider 505. Further, a third-party cluster 510, unrelated to the distributed secondary storage system, may also maintain a deduplication map 209. Such a configuration allows the distributed secondary storage system to reference deduplicated chunks outside of the system.

Figure 6:
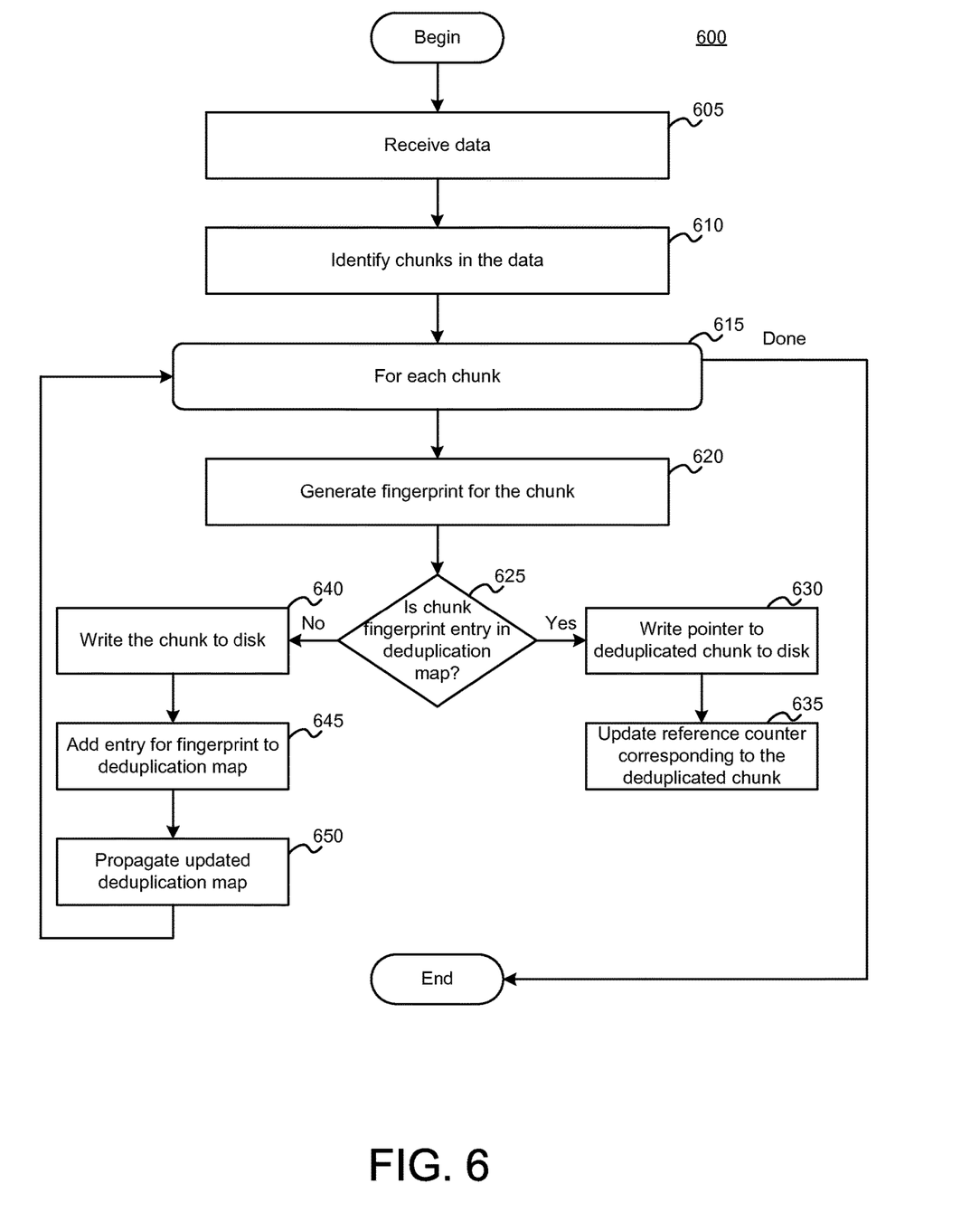
FIG. 6 illustrates a method for deduplicating chunks of data in a secondary storage system, according to one embodiment.

FIG. 6 illustrates a method 600 for deduplicating chunks of data in a secondary storage system, according to one embodiment. As shown, method 600 begins at step 605, where the chunker 211 receives data. As stated, the data can be an incoming stream from a client computing system (e.g., client computer 125), previously stored data on disk, and the like. Further, the data may correspond to data of a given file. At step 610, the chunker 211 identifies one or more chunks in the data.

At step 615, the deduplicator 208 enters a loop for each of the identified chunks. At step 620, the deduplicator 208 generates a fingerprint for the chunk. To do so, the deduplicator 208 may perform methods such as a Rabin algorithm, which returns a fingerprint of the chunk of data as a result. The deduplicator 208 evaluates the fingerprint against the deduplication map 209. As stated, the deduplication map 209 identifies, based on fingerprint, whether a matching chunk exists for the current chunk.

Figure 7:
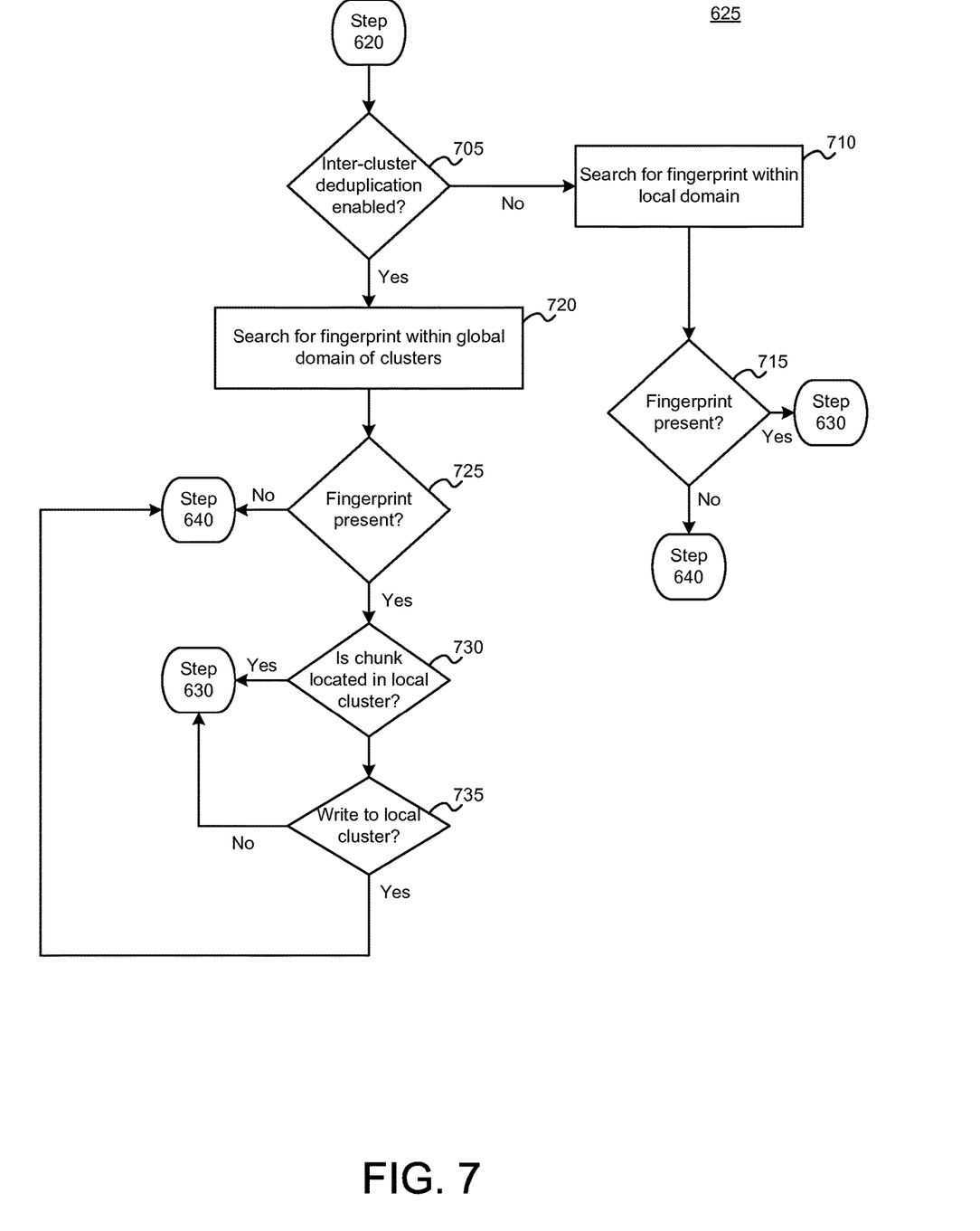
FIG. 7 illustrates a method for determining whether a chunk fingerprint is located in a deduplication map, according to one embodiment.

At step 625, the deduplicator 208 determines whether an entry for the chunk fingerprint exists in the deduplication map 209 based on the evaluation. If so, then at step 630, the deduplicator 208 creates a pointer to the location of the chunk specified in the deduplication map 209. To identify the location, the deduplicator 208 references the cluster ID and block ID fields associated with the fingerprint in the deduplication map 209. The cluster ID may correspond to the current cluster or other clusters, such as different geographical clusters of the enterprise or even the cloud. FIG. 7 describes step 625 in further detail. In any case, the block ID specifies a location within the specified cluster. More particularly, the block ID specifies in which node, disk, and location in the disk the chunk is stored.

In the event that the data represents an in-line stream of data, the deduplicator 208 writes the pointer to the chunk to disk. Doing so allows for faster writes of the data to the storage system 210. In the event that the data represents previously stored data, the deduplicator replaces the stored chunk with the pointer. At step 635, the deduplicator 208 updates the corresponding reference counter for the deduplicated chunk. As stated, each deduplicated chunk may be associated with a reference counter that indicates a number of pointers in the distributed secondary storage system that reference the chunk.

Otherwise, if an entry for the chunk fingerprint does not currently exist in the deduplication map 209, then at step 640, the deduplicator 208 writes the chunk to one of the storage disk (e.g., to HDD 116 or to SSD 118). At step 645, the deduplicator 208 adds an entry for the chunk fingerprint to the deduplication map 209. The entry references the fingerprint, cluster location, and node storage location, as well as whether the current cluster has inter-cluster deduplication enabled. Of course, as stated, the entry may include additional information. At step 650, the maintenance component 207 propagates the updated deduplication map to other nodes in the distributed secondary storage system. To do so, the maintenance component 207 may schedule the update to occur in the background, e.g., while the processing load on the secondary storage server 110 is relatively light.

FIG. 7 further illustrates step 625, where the deduplicator 208 determines whether a chunk fingerprint entry exists in the deduplication map 209. As shown, step 625 continues from step 620. At 705, the deduplicator 208 determines whether the local cluster has inter-cluster deduplication enabled. If not, then at step 710, the deduplicator 208 evaluates the deduplication map 209 relative to the local domain. That is, the deduplicator searches for a matching fingerprint within the local cluster. At step 715, if the fingerprint entry exists in the local cluster, then the method proceeds to step 630. Otherwise, the method proceeds to step 640.

Otherwise, if inter-cluster deduplication is enabled, then at 720, the deduplicator searches for a matching fingerprint in the global domain of clusters in the deduplication map 209. The global domain may include the local cluster, other clusters of the distributed storage system that have inter-cluster deduplication enabled, shared clusters in the cloud, and the like. As stated, the deduplication map 209 specifies searchable domains based on the domain ID flag.

At step 725, the deduplicator 208 determines whether a matching fingerprint is present in the deduplication map. If not, then the method proceeds to step 640, described above. If so, then at step 730, the deduplicator 208 determines ether the chunk is stored in a local cluster. If the chunk is stored in a node of the local cluster, the method proceeds to step 630, described above.

If the chunk is stored elsewhere, then the deduplicator 208 determines whether to write a copy of the chunk to the local cluster, rather than to write a pointer to the chunk hosted on another cluster. The determination may be based on various factors, such as cluster replication policy, geographic distance between clusters, etc. Writing the chunk locally to storage allows for faster retrieval in a subsequent access of that particular chunk. In the event that the deduplicator 208 determines to write to the local cluster, then the method proceeds to step 640. Otherwise, if the deduplicator 208 determines not to write to a local cluster (and instead create a pointer referencing the chunk), then the method proceeds to step 630.

Note, it is possible that identical chunk data may reside in multiple clusters as a result of secondary storage server nodes locally writing chunks, e.g., to satisfy replication policies. In such a case, it is also possible that the deduplicator 208 may have several options of chunk locations to reference when creating a pointer. The deduplicator 208 may determine which of the locations to reference based on various selection criteria. For example, the criteria may be based on geographic distance between clusters that store the chunk, cluster availability, and bandwidth.

Figure 8:
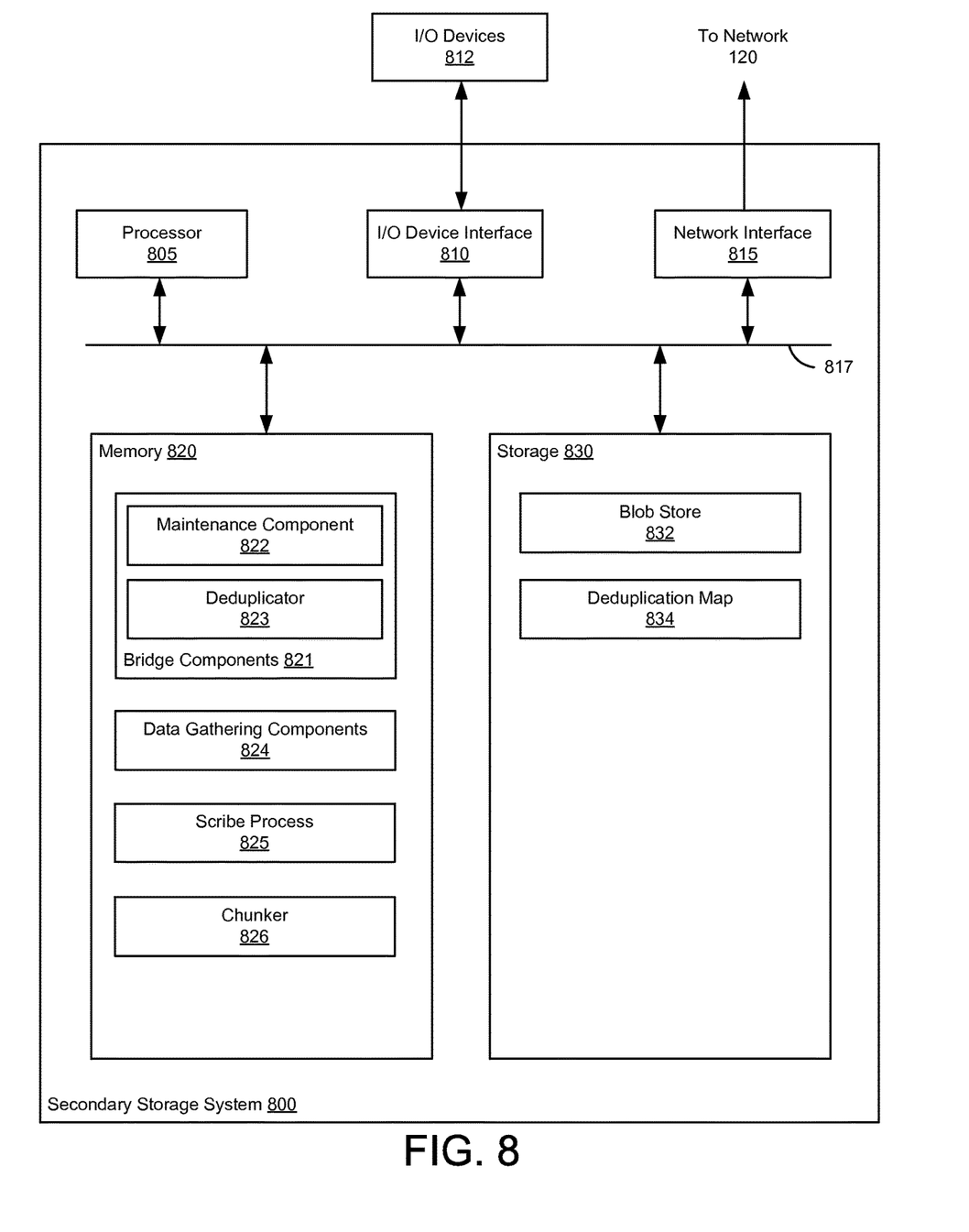
FIG. 8 illustrates an example secondary storage system configured to support inter-cluster deduplication, according to one embodiment.

FIG. 8 illustrates an example secondary storage system 800 configured to support inter-cluster deduplication, according to one embodiment. As shown, secondary storage system 800 includes, without limitation, a central processing unit (CPU) 805, a network interface 815, a memory 820, and storage 830, each connected to a bus 817. System 800 may also include an I/O device interface 810 connecting I/O devices 812 (e.g., keyboard, display and mouse devices) to the secondary storage system 800. Further, in context of this disclosure, the computing elements shown in secondary storage system 800 may correspond to a physical computing system (e.g., a system in a data center) or may be a virtual computing instance executing within a computing cloud. In one embodiment, the secondary storage system 800 is a node in a distributed secondary storage system cluster. The distributed secondary storage system itself may be composed of multiple clusters.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes bridge components 821, data gathering components 824, a scribe process 825, and a chunker 826. And storage 830 includes a blob store 832 and a deduplication map 834. The bridge components 821 provide a file system architecture for the distributed secondary storage system. The data gathering components 824 allow the secondary storage system 800 to communicate with primary storage servers and retrieve data from the primary storage servers.

In one embodiment, the scribe process 825 maintains information about the chunks of data in the blob store 832 in key-value stores (e.g., tree structures). One example key-value store may map blob structures to brick sections. Another store may map bricks to chunks.

In one embodiment, the bridge components 821 include a maintenance component 822 and a deduplicator 823. The maintenance component 822 includes one or more self-maintenance processes that ensure that the file system remains consistent, e.g., by correcting inconsistencies or updating file system structures after a given process is performed. In one embodiment, the deduplicator 823 receives data (e.g., an incoming stream of data or post-process data) and identifies chunks in the data.

For each chunk, the deduplicator 823 generates a fingerprint and evaluates the fingerprint against the deduplication map 834. The deduplication map 834 provides a list of entries of fingerprints maintained by the distributed secondary storage system. In addition, the deduplication map 834 entries may be from other clusters apart from the local clusters. For example, one entry may correspond to a fingerprint located in a geographically separated cluster, while another entry may correspond to a fingerprint located in the cloud. The deduplicator 823 evaluates the fingerprint to determine whether a matching fingerprint exists in the deduplication map 834. If so, rather than write the corresponding chunk to local disk, the deduplicator 823 may instead write a pointer that references the chunk in the location specified in the deduplication map 834. If not, the deduplicator 823 writes the chunk to disk and updates the deduplication map 834 with an entry corresponding to the chunk fingerprint.

Further, if a matching deduplicated chunk is stored remotely, the deduplicator 823 may determine to store a copy of the chunk locally rather than create a pointer for that chunk. The deduplicator 823 so determines based on various factors, such as cluster replication policies, geographical distance, and the like. Further still, if the deduplication map 834 indicates that multiple clusters store a given deduplicated chunk, the deduplicator 823 may determine, based on selection criteria, which location to reference. The selection criteria may include geographical distance, availability, and bandwidth.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
receiving, at a storage system, an incoming stream of data;
identifying, via the storage system, one or more chunks in the incoming stream of data;
generating a first fingerprint corresponding to at least one chunk of the one or more chunks;
determining that the first fingerprint matches a second fingerprint of a plurality of fingerprints listed in a corresponding entry in a deduplication map associated with a plurality of storage clusters, wherein each entry in the deduplication map corresponds to a chunk stored in at least one of the plurality of storage clusters, wherein a first cluster of the plurality of storage clusters is located at a first geographic location and a second cluster of the plurality of storage clusters is located at a second geographic location, wherein the at least one chunk corresponding to the second fingerprint is stored by a plurality of other clusters;
in response to a determination that the first fingerprint matches the second fingerprint, determining to write a pointer to the at least one chunk based in part on one or more deduplication factors;
based on selection criteria, selecting which of the plurality of other clusters storing the at least one chunk to which the pointer is to be written; and in response to a selection of one of the other clusters storing the at least one chunk, writing the pointer to the at least one chunk stored by the one of the other clusters.

2. The method of claim 1, wherein the one or more deduplication factors include at least one of distance between the storage system and the plurality of storage clusters, availability of the plurality of storage clusters, and/or a bandwidth of the plurality of storage clusters.

3. The method of claim 1, wherein the selection criteria includes a distance between the plurality of other clusters storing the at least one chunk, availability of the plurality of other clusters storing the at least one chunk, and/or a bandwidth of the plurality of other clusters storing the at least one chunk.

4. The method of claim 1, further comprising updating a reference counter associated with the at least one chunk.

5. The method of claim 1, wherein the corresponding entry specifies a location for the at least one chunk in the second cluster.

6. The method of claim 1, wherein the deduplication map is global to the plurality of storage clusters.

7. A computer program product being embodied in a non-transitory computer readable storage medium and comprising computer instructions for:
receiving, at a storage system, an incoming stream of data;
identifying, via the storage system, one or more chunks in the incoming stream of data;
generating a first fingerprint corresponding to at least one chunk of the one or more chunks;
determining that the first fingerprint matches a second fingerprint of a plurality of fingerprints listed in a corresponding entry in a deduplication map associated with a plurality of storage clusters, wherein each entry in the deduplication map corresponds to a chunk stored in at least one of the plurality of storage clusters, wherein a first cluster of the plurality of storage clusters is located at a first geographic location and a second cluster of the plurality of storage clusters is located at a second geographic location, wherein the at least one chunk corresponding to the second fingerprint is stored by a plurality of other clusters;
in response to determining that the first fingerprint matches the second fingerprint, determining to write a pointer to the at least one chunk based in part on one or more deduplication factors;
based on selection criteria, selecting which of the plurality of other clusters storing the at least one chunk to which the pointer is to be written; and
in response to a selection of one of the other clusters storing the at least one chunk, writing the pointer to the at least one chunk stored by the one of the other clusters.

8. The computer program product of claim 7, wherein the one or more deduplication factors include at least one of distance between the storage system and the plurality of storage clusters, availability of the plurality of storage clusters, and/or a bandwidth of the plurality of storage clusters.

9. The computer program product of claim 7, wherein the selection criteria includes a distance between the plurality of other clusters storing the at least one chunk, availability of the plurality of other clusters storing the at least one chunk, and/or a bandwidth of the plurality of other clusters storing the at least one chunk.

10. The computer program product of claim 7, further comprising computer instructions for updating a reference counter associated with the at least one chunk.

11. A system, comprising:
a processor configured to:
receive an incoming stream of data;
identify one or more chunks in the incoming stream of data;
generate a first fingerprint corresponding to at least one chunk of the one or more chunks;
determine that the first fingerprint matches a second fingerprint of a plurality of fingerprints listed in a corresponding entry in a deduplication map associated with a plurality of storage clusters, wherein each entry in the deduplication map corresponds to a chunk stored in at least one of the plurality of storage clusters, wherein a first cluster of the plurality of storage clusters is located at a first geographic location and a second cluster of the plurality of storage clusters is located at a second geographic location, wherein the at least one chunk corresponding to the second fingerprint is stored by a plurality of other clusters;
in response to a determination that the first fingerprint matches the second fingerprint, determine to write a pointer to the at least one chunk based in part on one or more deduplication factors;
based on selection criteria, selecting which of the plurality of other clusters storing the at least one chunk to which the pointer is to be written; and
in response to a selection of one of the other clusters storing the at least one chunk, write the pointer to the at least one chunk stored by the one of the other clusters; and
a memory coupled to the processor and configured to provide the processor with instructions.

12. The system of claim 11, wherein the one or more deduplication factors include at least one of distance between a storage system and the plurality of storage clusters, availability of the plurality of storage clusters, and/or a bandwidth of the plurality of storage clusters.

13. The system of claim 11, wherein the selection criteria includes a distance between a storage system and the plurality of other clusters storing the at least one chunk, availability of the plurality of other clusters storing the at least one chunk, and/or a bandwidth of the plurality of other clusters storing the at least one chunk.

14. The system of claim 11, wherein the processor is further configured to update a reference counter associated with the at least one chunk.

* * * * *